US009127720B2

(12) United States Patent
Saeki et al.

(10) Patent No.: US 9,127,720 B2
(45) Date of Patent: Sep. 8, 2015

(54) TORQUE FLUCTUATION ABSORBING APPARATUS

(75) Inventors: Tomohiro Saeki, Anjo (JP); Satoshi Nakagaito, Kariya (JP); Makoto Takeuchi, Obu (JP); Yoshitaka Inoshita, Kariya (JP); Masahiko Sato, Nishio (JP); Toshiyuki Saburi, Nagoya (JP); Yusaku Nishio, Toyoake (JP); Tsutomu Sekine, Kariya (JP); Yuki Ishikawa, Anjo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 370 days.

(21) Appl. No.: 13/514,386

(22) PCT Filed: Sep. 21, 2010

(86) PCT No.: PCT/JP2010/066327
§ 371 (c)(1),
(2), (4) Date: Jun. 7, 2012

(87) PCT Pub. No.: WO2011/070835
PCT Pub. Date: Jun. 16, 2011

(65) Prior Publication Data
US 2012/0242017 A1      Sep. 27, 2012

(30) Foreign Application Priority Data

Dec. 11, 2009   (JP) .................................. 2009-281386

(51) Int. Cl.
    *F16D 7/02*    (2006.01)
    *F16D 3/66*    (2006.01)
    *F16F 15/129*    (2006.01)

(52) U.S. Cl.
    CPC ........ *F16D 7/027* (2013.01); *F16D 3/66* (2013.01); *F16F 15/1292* (2013.01)

(58) Field of Classification Search
    CPC .......... F16D 3/66; F16D 7/027; F16F 15/1292
    USPC .............................. 464/46, 68.41; 192/214.1
    See application file for complete search history.

(56) References Cited

U.S. PATENT DOCUMENTS 755,953 A  *  3/1904  Smith ............................. 464/46
(Continued)

FOREIGN PATENT DOCUMENTS

| JP | 11-30287 A | 2/1999 |
|---|---|---|
| JP | 2005-127507 A | 5/2005 |
| JP | 2008-121762 A | 5/2008 |

(Continued)

OTHER PUBLICATIONS

English language translation of International Preliminary Report on Patentability (Form PCT/IB/373) issued on Jul. 10, 2012, in the corresponding International Application No. PCT/JP2010/066327. (3 pages).

(Continued)

*Primary Examiner* — Gregory Binda
(74) *Attorney, Agent, or Firm* — Buchanan Ingersoll & Rooney PC

(57) ABSTRACT

A fluctuation absorbing apparatus includes a first plate secured to a flywheel, a second plate disposed at a distance from the first plate, a third plate slidably sandwiched between the first plate and the second plate, and a resilient section that is supported by, fixed to or integrated with the first plate or the second plate and biases the second plate toward the first plate.

6 Claims, 14 Drawing Sheets

(EXAMPLE 1)

(56) References Cited

U.S. PATENT DOCUMENTS

| | | |
|---|---|---|
| 3,600,877 A * | 8/1971 | McCrary et al. |
| 4,848,551 A * | 7/1989 | Caspar ................. 192/214.1 |
| 5,759,105 A * | 6/1998 | Bochot et al. |
| 6,015,033 A | 1/2000 | Fukushima |
| 7,207,887 B2 | 4/2007 | Nakagaito et al. |
| 2008/0110719 A1 | 5/2008 | Saeki et al. |

FOREIGN PATENT DOCUMENTS

| | | |
|---|---|---|
| JP | 2009-85318 A | 4/2009 |

OTHER PUBLICATIONS

International Search Report (PCT/ISA/210) issued on Oct. 26, 2010, by the Japanese Patent Office as the International Searching Authority for International Application No. PCT/JP2010/066327.

* cited by examiner

FIG.1 (EXAMPLE 1)
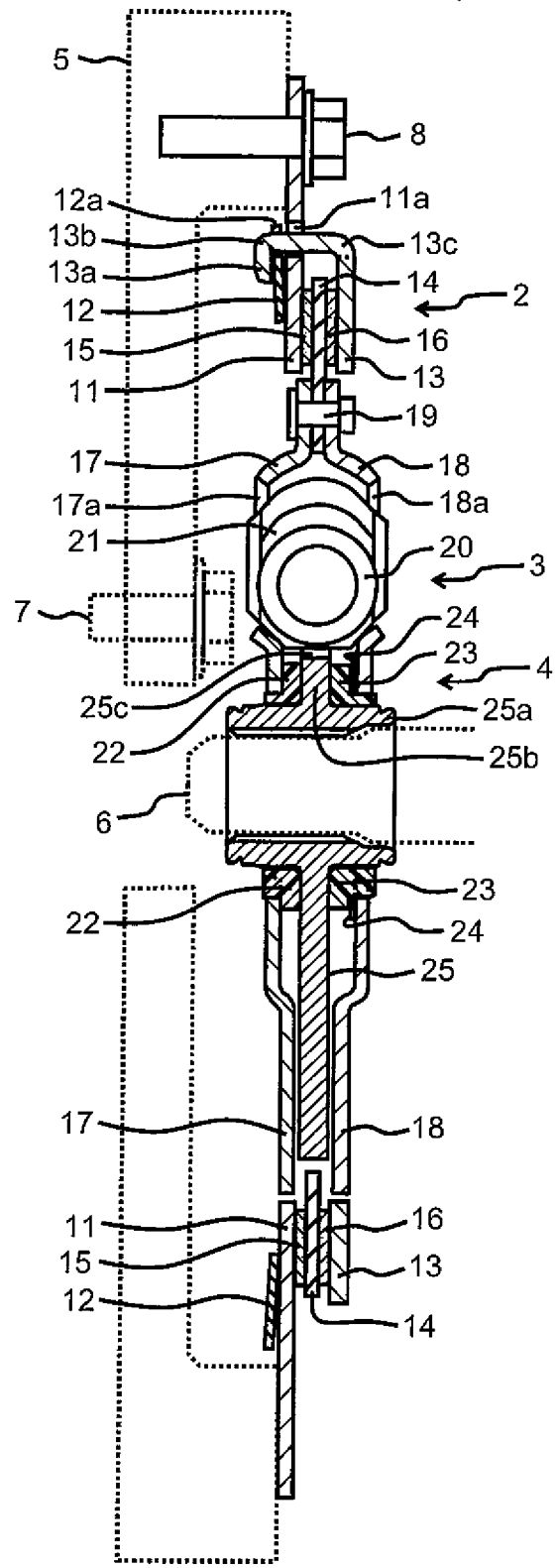

FIG.2 (EXAMPLE 2)
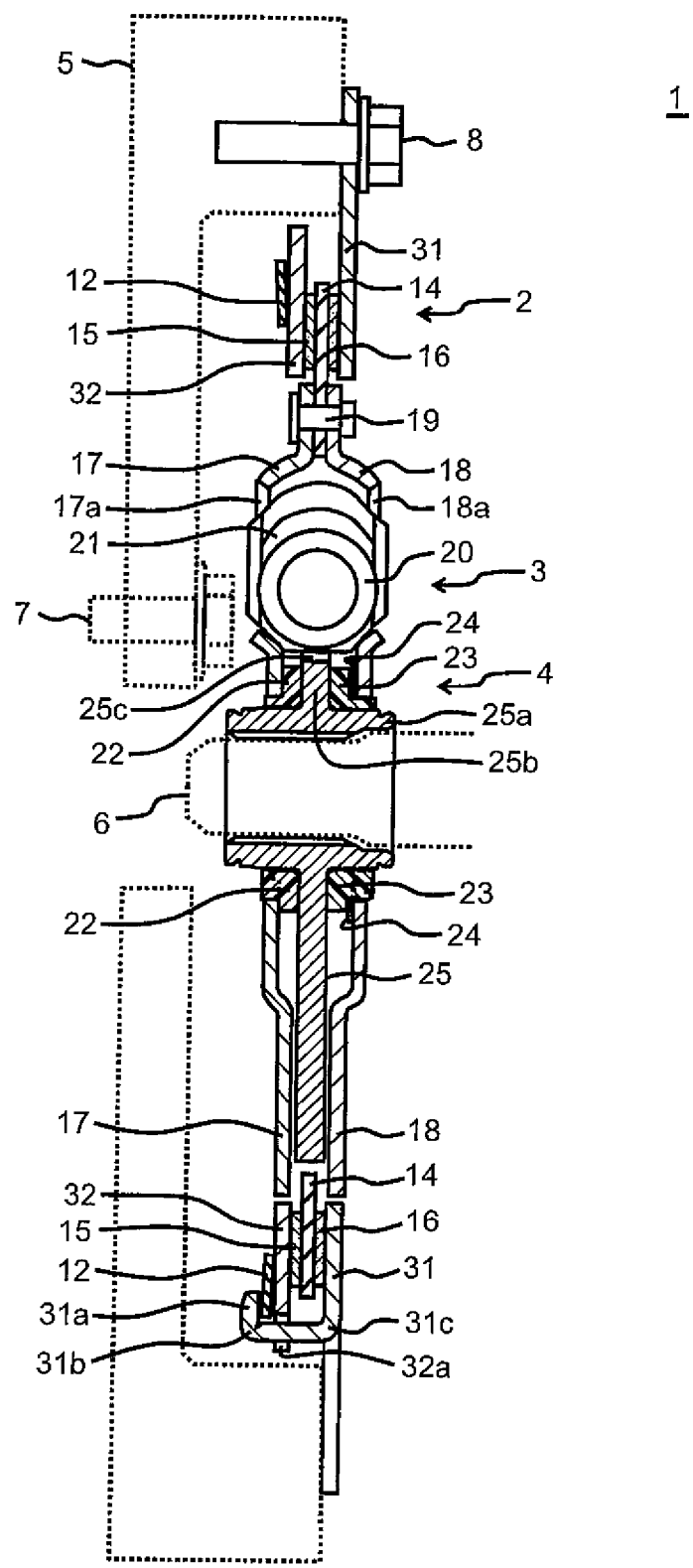

(EXAMPLE 3)

(EXAMPLE 4)

(EXAMPLE 5)

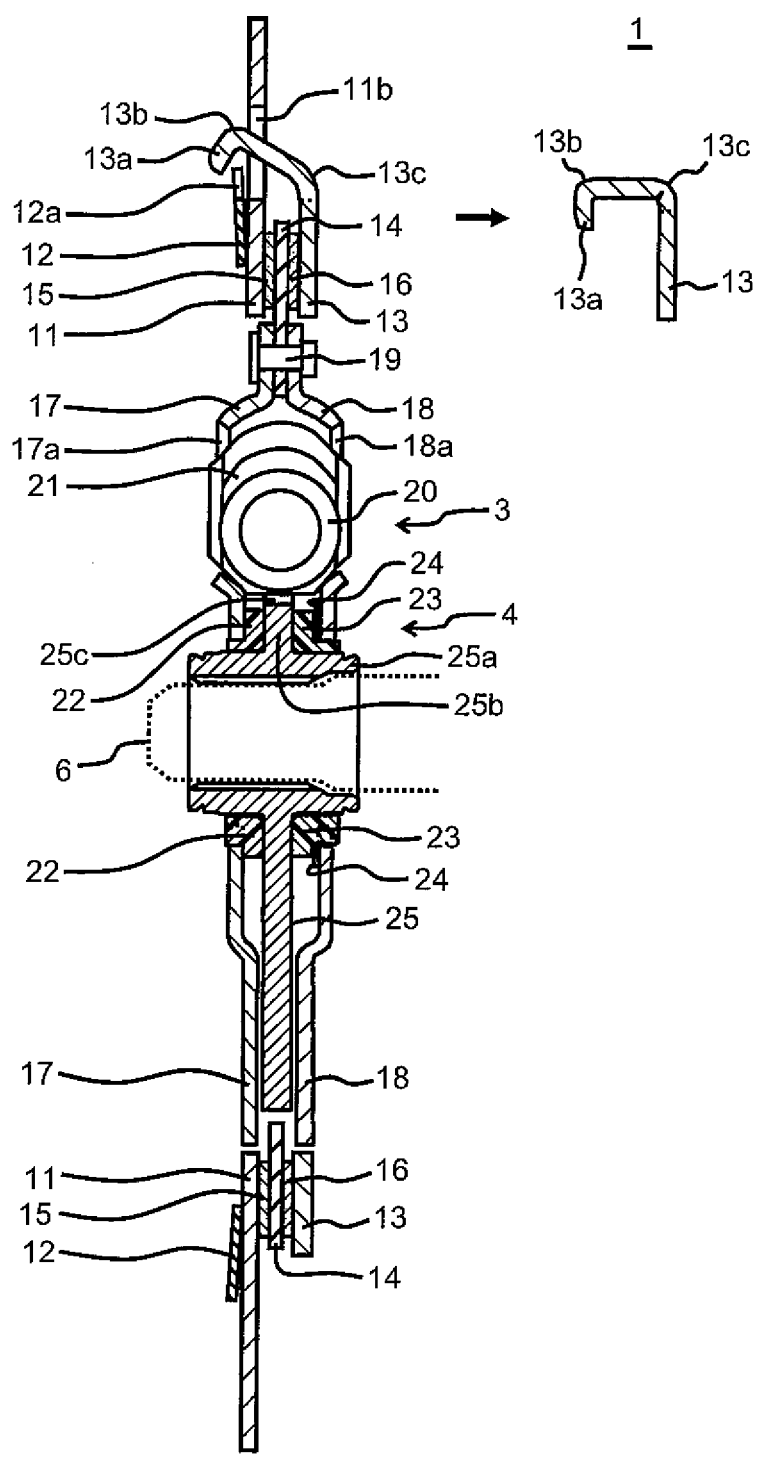
FIG.6 (EXAMPLE 6)

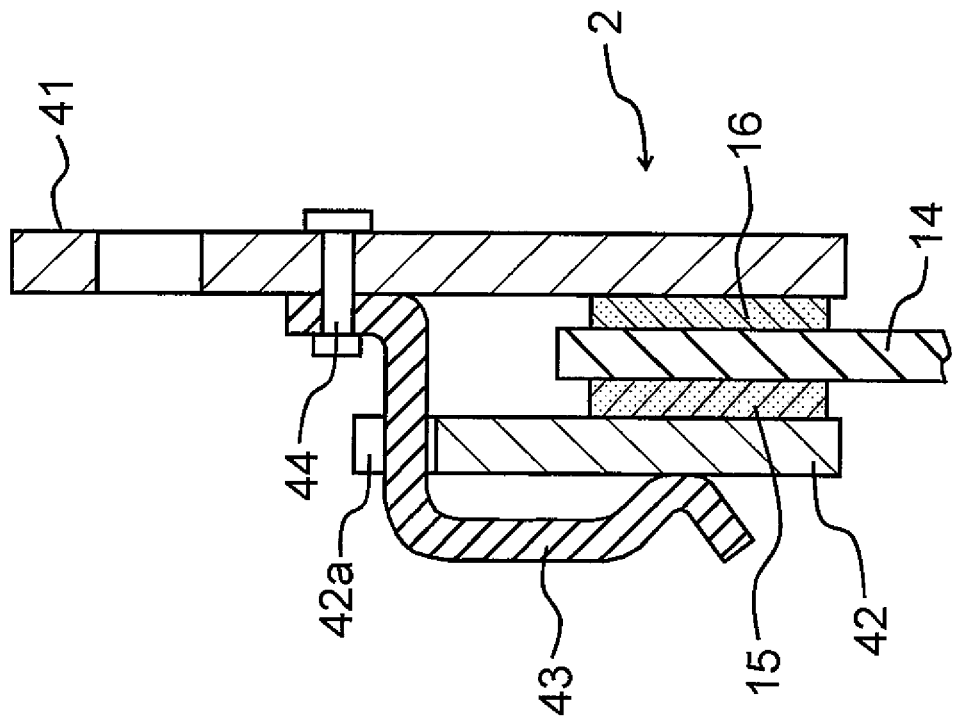
FIG.7 (EXAMPLE 7)

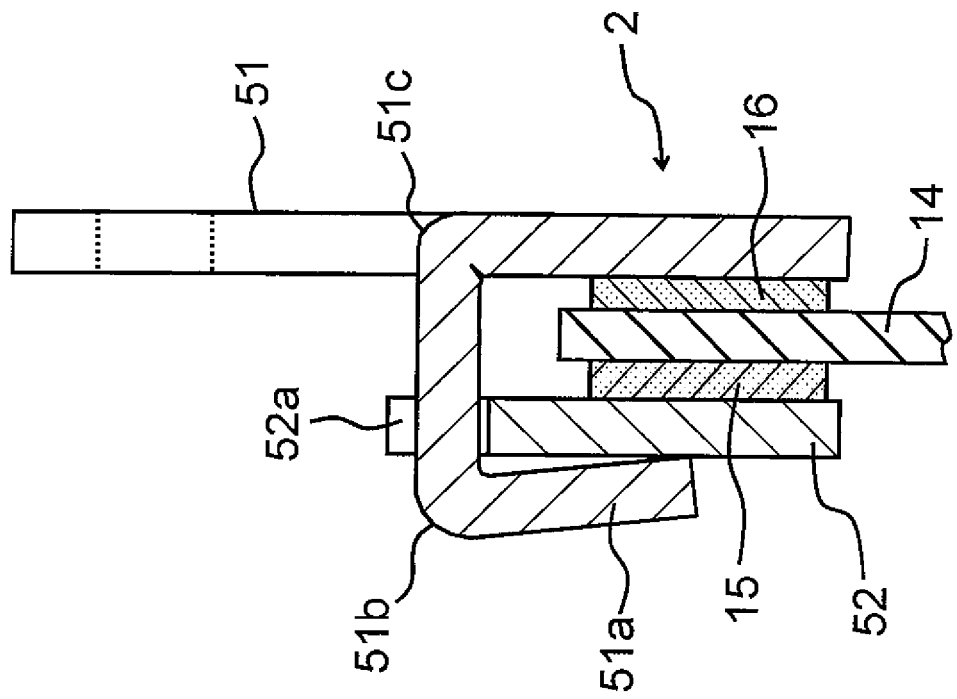

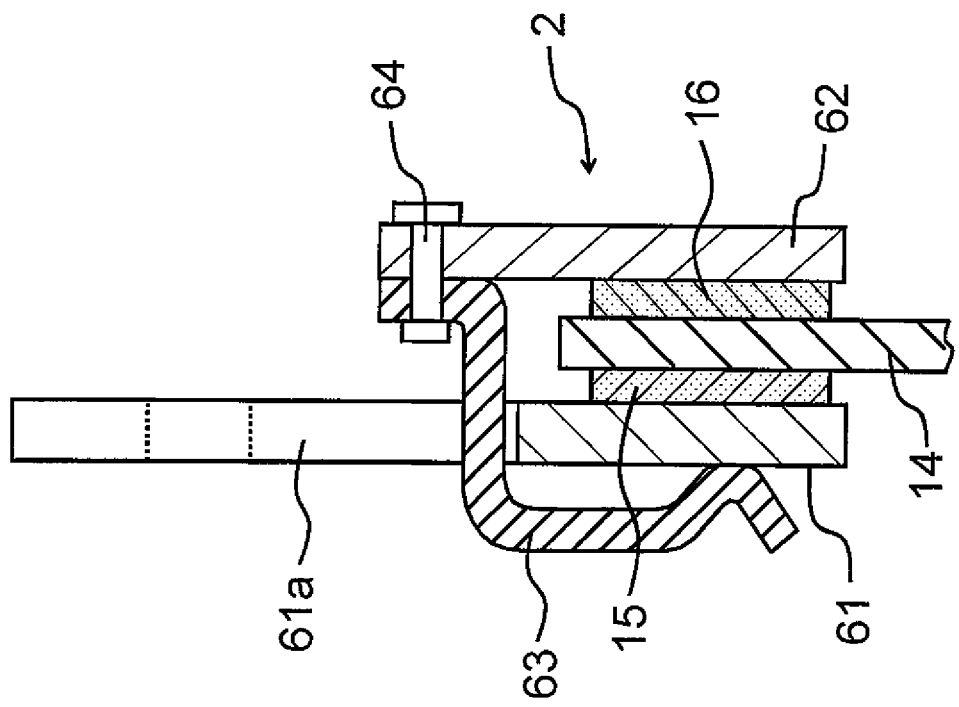
FIG.9 (EXAMPLE 9)

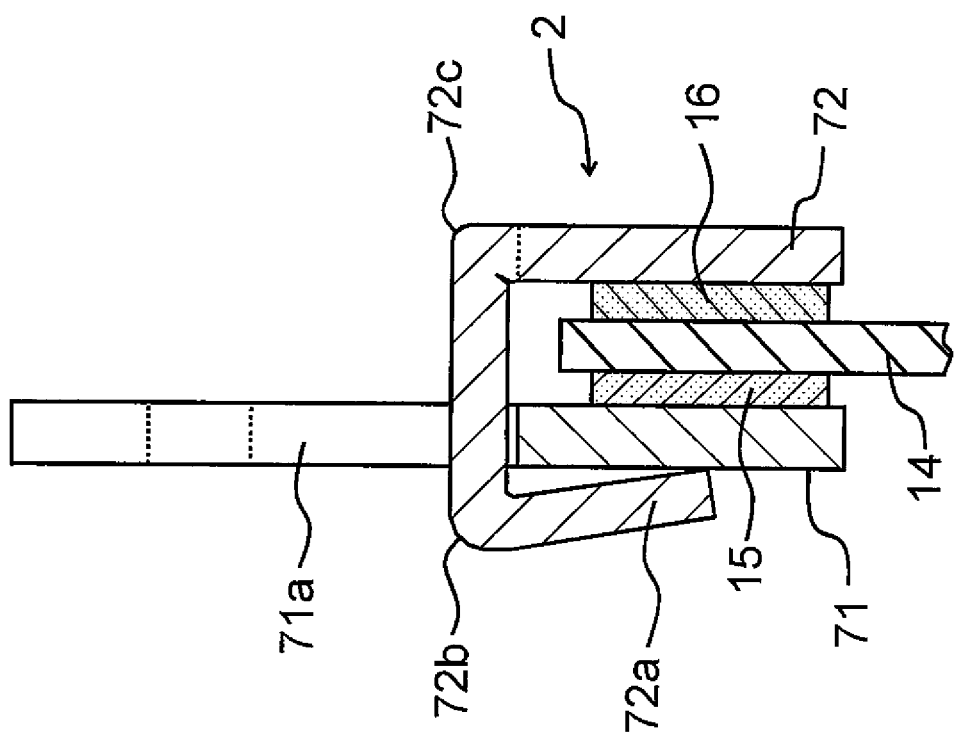
FIG.10 (EXAMPLE 10)

(EXAMPLE 11)
FIG.11A
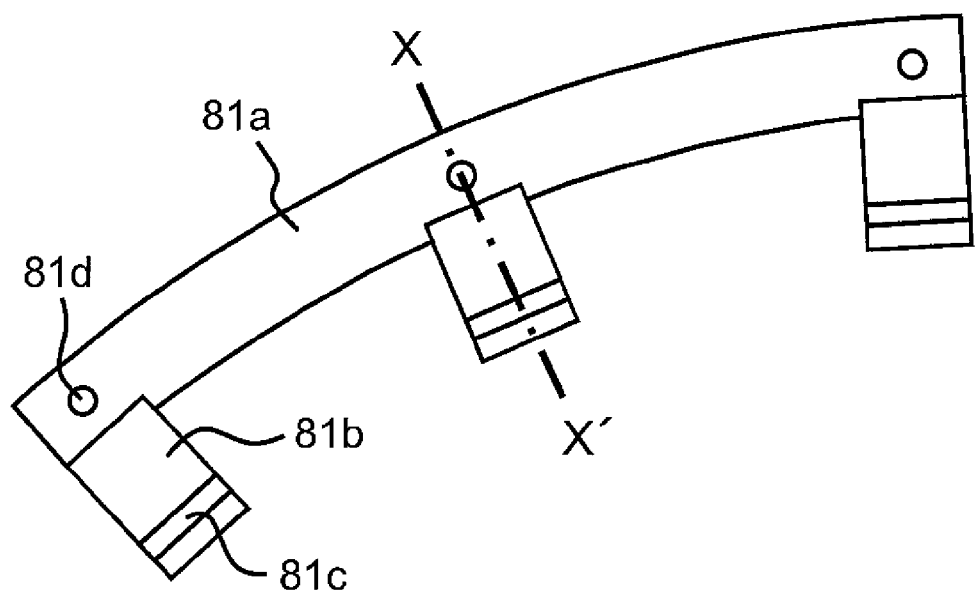
FIG.11B X-X'
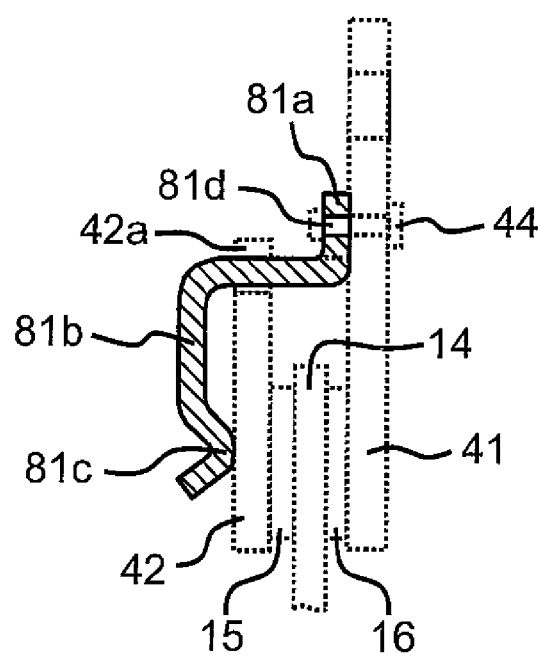

FIG.12A (EXAMPLE 11)
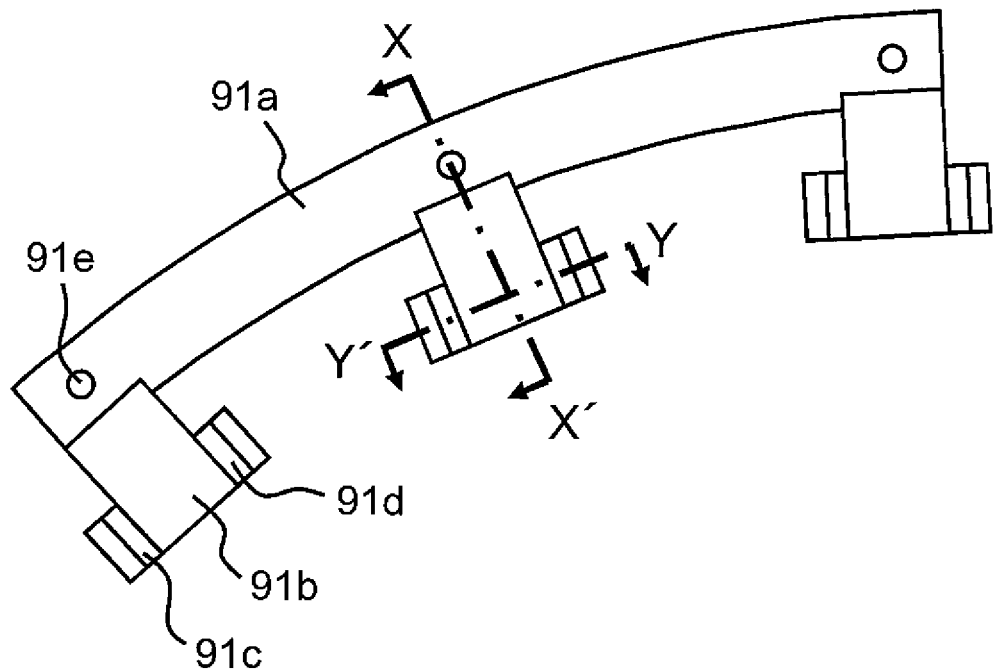
FIG.12B X–X'
FIG.12C Y–Y'
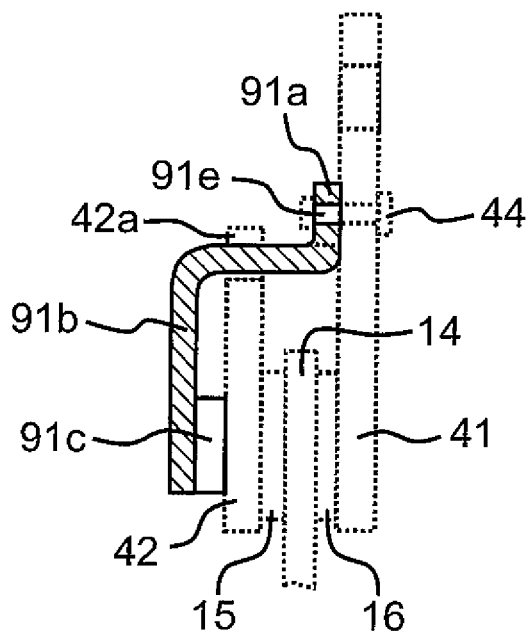

TORQUE FLUCTUATION ABSORBING APPARATUS

TECHNICAL FIELD

Reference to Related Application

The present application claims priority right based on Japanese Patent Application No. 2009-281386 (filed on Dec. 11, 2009), and the entire disclosure contents thereof being incorporated by reference into the resent application.

The present invention relates to a torque fluctuation absorbing apparatus that absorbs a fluctuating torque between rotating shafts and has a limiter unit that slides when the fluctuating torque reaches a predetermined value.

BACKGROUND

A torque fluctuation absorbing apparatus is disposed, for example, in a power transmission path between an engine and a clutch, and absorbs (suppresses) a fluctuating torque caused by the engine and a transmission. There is a torque fluctuation absorbing apparatus comprising: a damper unit that absorbs the fluctuating torque with a spring force, a hysteresis unit that absorbs (suppresses) the fluctuating torque with a hysteresis torque generated by friction and the like, and a limiter unit that slides when a torsion between rotating shafts cannot be absorbed by the damper unit and the hysteresis unit. In the limiter unit, a lining plate, both surfaces of which has a friction member attached thereto, is interposed between a pressure plate and a cover plate, and the pressure plate biased by a disc spring presses the lining plate toward the cover plate, resulting in that the friction members are slidably pressed onto the pressure plate and the cover plate, respectively (refer to, for example, Patent Literature PTL 1).

PTL 1: JP Patent Kokai Publication JP2005-127507A (FIG. 2)

SUMMARY

Contents of the entire disclosure of Patent Literature PLT 1 are incorporated herein by reference. Following analysis is made according to the present invention.

However, the disc spring of the limiter unit described in Patent Literature PLT 1 together with the cover plate are supported by a support plate attached to a flywheel, disadvantageously increasing the number of components. Further, like the cover plate, the support plate is annular and has a large diameter and thus, its material size is large and a large amount of discarded material is generated in processing, which increases costs.

It is a main object of the present invention to provide a torque fluctuation absorbing apparatus capable of achieving cost reduction.

From one aspect of the present invention, a torque fluctuation absorbing apparatus comprises: a first plate fixed to a flywheel; a second plate disposed at a distance from the first plate; a third plate slidably sandwiched between the first plate and the second plate and a resilient section that is supported by, fixed to or integrated with the first plate or the second plate and biases the second plate toward the first plate.

In the torque fluctuation absorbing apparatus according to the present invention, it is preferred that the first plate has a plurality of holes or recesses, the resilient section is an annular disc spring supported by the first plate, and the second plate has a plurality of support parts that receive a pressing force of the annular disc spring through the corresponding holes or recesses.

In the torque fluctuation absorbing apparatus according to the present invention, it is preferred that the support parts each include a first bending section bent toward the first plate on its proximal end side and a second bending section bent toward a radially inner circumference side on its distal end side, and receive a pressing force of the annular disc spring in a region more distal than the second bending section.

In the torque fluctuation absorbing apparatus according to the present invention, it is preferred that the second plate has a plurality of holes or recesses, the resilient section is an annular disc spring that biases the second plate toward the first plate, and the first plate has support parts that support the annular disc spring through the corresponding holes or recesses.

In the torque fluctuation absorbing apparatus according to the present invention, it is preferred that the support parts each have a first bending section bent toward the second plate on its proximal end side and a second bending section bent toward a radially inner circumference side on its distal side, and receive a pressing force of the annular disc spring in a region more distal than the second bending section.

In the torque fluctuation absorbing apparatus according to the present invention, it is preferred that a region between the first bending section and the second bending section of each of the support parts passes through the corresponding hole or recess and engages with the hole or the recess with a predetermined backlash so as to be relatively unrotatable and axially displaceable.

In the torque fluctuation absorbing apparatus according to the present invention, it is preferred that the annular disc spring has a plurality of holes or recesses that unrotatably engage with the corresponding support parts.

In the torque fluctuation absorbing apparatus according to the present invention, it is preferred that one or both of the first bending section and the second bending section of each of the support parts has a guide recess or a guide hole that guides the bending section.

In the torque fluctuation absorbing apparatus according to the present invention, it is preferred that the support parts each have a small-width section having a smaller circumferential width than other sections in a region more distal than the first bending section or in a region between the first bending section and the second bending section.

In the torque fluctuation absorbing apparatus according to the present invention, it is preferred that the second plate has a plurality of holes or recesses, the resilient section is a plate spring member obtained by forming a plate material into a predetermined shape, and the plate spring member is secured to the first plate with a rivet(s), passes through the corresponding hole or recess and biases the second plate toward the first plate.

In the torque fluctuation absorbing apparatus according to the present invention, it is preferred that the second plate has a plurality of holes or recesses, and the first plate as the resilient section has a spring section that passes through the corresponding hole or recess and biases the second plate toward a main body of the first plate at its distal end.

In the torque fluctuation absorbing apparatus according to the present invention, it is preferred that the first plate has a plurality of holes or recesses, the resilient section is a plate spring member obtained by forming a plate material into a predetermined shape, and the plate spring member is secured to the second plate with a rivet(s), passes through the corresponding hole or recess, is supported by the first plate at its distal end and biases the second plate toward the first plate.

In the torque fluctuation absorbing apparatus according to the present invention, it is preferred that the first plate has a plurality of holes or recesses, and the second plate as the resilient section has a spring section that passes through the corresponding hole or recess, is supported by the first plate at its distal end and biases a main body of the second plate toward the first plate.

In the torque fluctuation absorbing apparatus according to the present invention, it is preferred that the plate spring member has an arcuate base section, a plurality of extending sections that extend from predetermined sites in a radially inner circumferential end of the base section and have a plate spring function and pressing sections that are formed in the extending sections and press the second plate toward the first plate, and the base section is secured to the first plate with the plurality of rivets, with the extending sections passing through the corresponding holes or recesses.

In the torque fluctuation absorbing apparatus according to the present invention, it is preferred that the base section is secured to the first plate with the rivets in the vicinity of radially outer circumferences of the extending sections.

In the torque fluctuation absorbing apparatus according to the present invention, the pressing sections protrude toward the second plate along the circumferential direction.

In the torque fluctuation absorbing apparatus according to the present invention, it is preferred that the extending sections have regions protruding from both circumferential sides on its radially inner circumference, and the pressing sections are formed on the protruding regions of the extending sections and protrude toward the second plate along a radial direction.

According to the present invention, since the resilient section supported by, fixed to or integrated with the first plate or the second plate biases the second plate toward the first plate, the third plate can be sandwiched between the first plate and the second plate without using the support plate according to the conventional art, enabling reduction of the number of components and costs of the apparatus.

BRIEF DESCRIPTION OF THE DRAWINGS

FIG. 1 is a radial sectional view schematically showing a structure of a torque fluctuation absorbing apparatus according to Example 1 of the present invention.

FIG. 2 is a radial sectional view schematically showing a structure of a torque fluctuation absorbing apparatus according to Example 2 of the present invention.

FIG. 6 is a radial sectional view illustrating assembling of a pressure plate in a torque fluctuation absorbing apparatus according to Example 6 of the present invention.

FIG. 7 is a radial partial sectional view schematically showing a structure of a limiter unit of a torque fluctuation absorbing apparatus according to Example 7 of the present invention.

FIG. 8 is a radial partial sectional view schematically showing a structure of a limiter unit of a torque fluctuation absorbing apparatus according to Example 8 of the present invention.

FIG. 9 is a radial partial sectional view schematically showing a structure of a limiter unit of a torque fluctuation absorbing apparatus according to Example 9 of the present invention.

FIG. 10 is a radial partial sectional view schematically showing a structure of a limiter unit of a torque fluctuation absorbing apparatus according to Example 10 of the present invention.

FIG. 11A is a plan view showing a structure of a plate spring member of a limiter unit in a torque fluctuation absorbing apparatus according to Example 11 of the present invention.

FIG. 11B is a sectional view taken along a line X-X' showing a structure of a plate spring member of a limiter unit in a torque fluctuation absorbing apparatus according to Example 11 of the present invention.

FIG. 12A is a plan view showing a structure of a plate spring member of a limiter unit in a torque fluctuation absorbing apparatus according to Example 12 of the present invention.

FIG. 12B is a sectional view taken along a line X-X' showing a structure of a plate spring member of a limiter unit in a torque fluctuation absorbing apparatus according to Example 12 of the present invention.

FIG. 12C is a sectional view taken along a line Y-Y' showing a structure of a plate spring member of a limiter unit in a torque fluctuation absorbing apparatus according to Example 12 of the present invention.

PREFERRED MODES

Figure 3A:
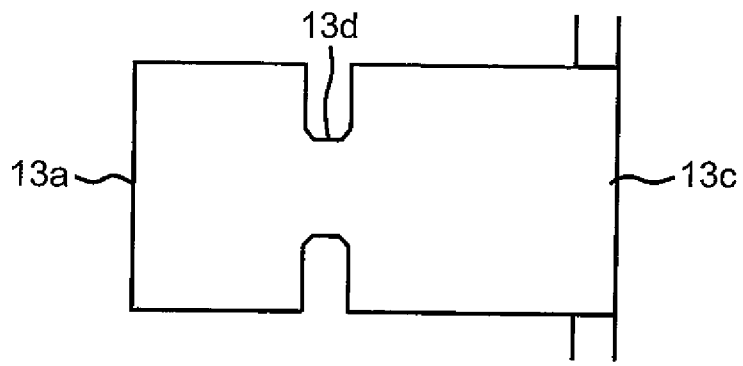
FIG. 3A is a partial plan view before assembling when viewed in the radial direction, which schematically show a structure of a support part of a pressure plate in a torque fluctuation absorbing apparatus according to Example 3 of the present invention.

A torque fluctuation absorbing apparatus according to an exemplary embodiment of the present invention includes a first plate (11 in FIGS. 1, 6, 31 in FIG. 2, 41 in FIG. 7, 51 in FIG. 8, 61 in FIG. 9, 71 in FIG. 10) fixed to a flywheel (5 in FIGS. 1, 2, 6), a second plate (13 in FIGS. 1, 6, 32 in FIG. 2, 42 in FIG. 7, 52 in FIG. 8, 62 in FIG. 9, 72 in FIG. 10) disposed at a distance from the first plate, a third plate (14 in FIGS. 1, 2, 6 to 10) slidably sandwiched between the first plate and the second plate, and a resilient section (annular disc spring 12 in FIGS. 1, 2, 6, a plate spring member 43 in FIG. 7, a spring section 51a in FIG. 8, a plate spring member 63 in FIG. 9, a spring section 72a in FIG. 10) that is supported by the first plate or the second plate (a first plate 11 in FIGS. 1, 6, support parts 31a of a first plate 31 in FIG. 2), fixed to the first plate or the second plate (with a rivet(s) 44 in FIG. 7, a rivet(s) 64 in FIG. 9), or integrated with (51 in FIG. 8, 72 in FIG. 10), and biases the second plate toward the first plate.

Example 1

A torque fluctuation absorbing apparatus according to Example 1 of the present invention will be described with reference to the accompanying drawings. FIG. 1 is a radial sectional view schematically showing a structure of the torque fluctuation absorbing apparatus according to Example 1 of the present invention.

Referring to FIG. 1, the torque fluctuation absorbing apparatus 1 is provided, for example, in a power transmission path between a crank shaft (not shown) of an engine and an input shaft 6 of a transmission, and absorbs (suppresses) a fluctuating torque caused by torsion between the crank shaft and the input shaft 6. The torque fluctuation absorbing apparatus 1 has a torsion buffer function, and includes a damper unit 3 that absorbs the fluctuating torque with a spring force, a hysteresis unit 4 that absorbs (suppresses) the fluctuating torque with a hysteresis torque generated by a friction and the like and a limiter unit 2 that slides when the fluctuating torque cannot be absorbed by the damper unit 3 and the hysteresis unit 4. The limiter unit 2 is disposed in series with the damper unit 3 and the hysteresis unit 4 in a power transmission path. The damper unit 3 is disposed in parallel with the hysteresis unit 4 in the power transmission path.

The torque fluctuation absorbing apparatus 1 includes a cover plate 11, a disc spring 12, a pressure plate 13, a lining plate 14, friction members 15, 16, a first side plate 17, a second side plate 18, a rivet(s) 19, a coil spring(s) 20, a sheet member(s) 21, a first thrust member 22, a second thrust member 23, a disc spring 24 and a hub member 25, as main components.

The cover plate 11 is an annular member and is a component of the limiter unit 2. On the (radially) outer circumferential side, the cover plate 11 is fixedly attached to a flywheel 5 with a bolt(s) 8, and rotates integrally with the flywheel 5. The flywheel 5 is fastened to the crank shaft (not shown) of the engine with a bolt(s) 7. The cover plate 11 has a plurality of holes 11a to be engaged with the pressure plate 13 so as to be relatively unrotatable and axially displaceable. Corresponding support parts 13a of the pressure plate 13 are inserted into the holes 11a. By inserting the support parts 13a into the holes 11a, the cover plate 11 and the pressure plate 13 engage with each other with a predetermined backlash so as to be relatively unrotatable and axially displaceable. Although the holes 11a are formed in the cover plate 11 in FIG. 1, notches cut from the (radially) outer circumferential surface of the cover plate 11 may be formed in place of the holes 11a as long as the notches do not interfere with the position of the bolt(s) 8. On the inner circumferential side, the cover plate 11 is slidably in press contact with the friction member 15. An opposite surface of the cover plate 11 to the surface facing the friction member 15 supports one end of the disc spring 12.

The disc spring 12 is an annular disc-like spring disposed between the cover plate 11 and the support parts 13a of the pressure plate 13, and is a component of the limiter unit 2. One end of the disc spring 12 is supported by the cover plate 11 and the other end of the disc spring 12 presses the support parts 13a of the pressure plate 13 toward the flywheel 5, thereby putting a main body of the pressure plate 13 into press contact with the friction member 16. The disc spring 12 has a plurality of recesses 12a in its (radially) outer circumferential surface. The corresponding support parts 13a of the pressure plate 13 are inserted into the recesses 12a. By inserting the support parts 13a into the recesses 12a, the disc spring 12 and the pressure plate 13 engage with each other so as to be relatively unrotatable and axially displaceable, thereby preventing the disc spring 12 from coming out.

The pressure plate 13 is an annular member for pressing the lining plate 14 toward the cover plate 11 and is a component of the limiter unit 2. The pressure plate 13 has the plurality of support parts 13a that pass through the corresponding holes 11a of the cover plate 11 and receive a pressing force of the disc spring 12. Each support part 13a is a region that extends from a predetermined position on an outer circumferential surface of a main body of the pressure plate 13, and has a first bending section 13c bent toward the flywheel 5 on its proximal (base) end side and a second bending section 13b bent toward an inner circumference side on its distal end side. A region between the first bending section 13c and the second bending section 13b of each support part 13a passes through the hole 11a of the cover plate 11. Since the support parts 13a pass through the holes 11a, the pressure plate 13 and the cover plate 11 engage with each other with a predetermined backlash (gap) so as to be relatively unrotatable and axially displaceable. A region between the second bending section 13b and the front end of the support part 13a is disposed at a distance (i.e., spaced) from the cover plate 11 and receives the pressing force of the disc spring 12 toward the flywheel 5, thereby putting the main body of the pressure plate 13 into press contact with the friction member 16 to prevent the pressure plate 13 from coming out of the cover plate 11.

The lining plate 14 is an annular member disposed between the friction members 15, 16 in a space between the cover plate 11 and the pressure plate 13, and is a component of the limiter unit 2. On the inner circumferential side, the lining plate 14 is sandwiched between the first side plate 17 and the second side plate 18, and is fixed to the first side plate 17 and the second side plate 18 with a rivet(s) 19. On the outer circumferential side, the lining plate 14 extends between the friction members 15, 16, and is fixed to the friction members 15, 16 with a rivet(s), an adhesive or the like.

The friction member 15 is a component of the limiter unit 2, and is disposed between the lining plate 14 and the cover plate 11. The friction member 15 is annular. The friction member 15 is fixed to the lining plate 14. The friction member 15 is slidably in press contact with the cover plate 11. The friction member 15 may contain a rubber, a resin, fiber (short filament, long fiber) and friction factor μ adjusting particles.

The friction member 16 is a component of the limiter unit 2, and is disposed between the lining plate 14 and the pressure plate 13. The friction member 16 is annular. The friction member 16 is fixed to the lining plate 14. The friction member 16 is slidably in press contact with the pressure plate 13.

The first side plate 17 is an annular member disposed on a flange section 25b of the hub member 25 on the side of the flywheel 5, and is a component of the damper unit 3 and the hysteresis unit 4. An outer circumferential end of the first side plate 17 is integrally fixed to the lining plate 14 and the second side plate 18 with the rivet 19. The first side plate 17 has a window section(s) 17a that receives the coil spring 20 and the sheet member(s) 21 in the intermediate damper unit 3, end surface(s) ("end" being viewed in a circumferential direction) of the window section 17a is detachably in contact with the sheet member(s) 21. The first side plate 17 and the first thrust member 22 engage with each other in the hysteresis unit 4 on the inner circumference side than the damper unit 3 so as to be relatively unrotatable and axially displaceable. An inner circumferential end of the first side plate 17 is supported by the hub member 25 (hub section 25a) through the first thrust member 22 so as to be relatively rotatable.

The second side plate 18 is an annular member disposed on the flange section 25b of the hub member 25 on the side of the transmission (right side in FIG. 1), and is a component of the damper unit 3 and the hysteresis unit 4. At a circumferential end, the second side plate 18 is integrally fixed to the lining plate 14 and the first side plate 17 with rivet(s) 19. The second side plate 18 has a window section(s) 18a that receives the coil spring 20 and the sheet member(s) 21 in the intermediate damper unit 3, an end surface(s) ("end" being viewed in a circumferential direction) of the window section 18a is detachably in contact with the sheet member 21. The second side plate 18 supports the disc spring 24 in the hysteresis unit 4 on the inner circumference than the damper unit 3, and is engaged with the second thrust member 23 so as to be relatively unrotatable and axially displaceable. At an inner circumferential end, the second side plate 18 is supported by the hub member 25 (hub section 25a) through the second thrust member 23 so as to be relatively rotatable.

The rivet(s) 19 is a member that fixes the lining plate 14, the first side plate 17 and the second side plate 18 in an integral manner.

The coil spring(s) 20 is a component of the damper unit 3, is received in the window section(s) 17a, 18a, 25c formed on the side plates 17, 18 and the hub member 25 (flange section 25b), and is in contact with the sheet members 21 formed at its both ends. The coil spring 20 contracts when the side plates 17, 18 and the hub member 25 rotate relative to each other, and absorbs shock caused by a rotational difference between the side plates 17, 18 and the hub member 25. Although a straight spring or a spring formed by bending a straight spring can be used as the coil spring 20, an arc spring bent along its circumference can be also used to achieve a wide torsion (i.e., relative angular rotation).

The sheet member(s) 21 is a component of the damper unit 3, is received in the window section(s) 17a, 18a, 25c formed on the side plates 17, 18 and the hub member 25 (flange section 25b) and is disposed between circumferential-end surface(s) of the window section(s) 17a, 18a, 25c and an end of the coil spring 20. For the sheet member 21 a resin may be used to reduce wear of the coil spring 20.

The first thrust member 22 is a component of the hysteresis unit 4 and is an annular member disposed between the first side plate 17 and the hub member 25. The first thrust member 22 is disposed between the first side plate 17 and the flange section 25b in the axial direction, engages with the first side plate 17 so as to be relatively unrotatable and axially displaceable, and is slidably in press contact with the flange section 25b. The first thrust member 22 is also interposed between the first side plate 17 and the hub section 25a in the radial direction, and serves as a slide bearing (bush) for supporting the first side plate 17 on the hub section 25a so as to be relatively rotatable.

The second thrust member 23 is a component of the hysteresis unit 4 and is an annular member disposed between the second side plate 18 and the hub member 25. The second thrust member 23 is disposed between the disc spring 24 and the flange section 25b in the axial direction, is biased toward the flange section 25b by the disc spring 24 and is slidably in press contact with the flange section 25b. The second thrust member 23 and the second side plate 18 engage with each other so as to be relatively unrotatable and axially displaceable. The second thrust member 23 is also interposed between the second side plate 18 and the hub section 25a in the radial direction, and serves as a slide bearing (bush) for supporting the second side plate 18 on the hub section 25a so as to be relatively rotatable.

The disc spring 24 is a component of the hysteresis unit 4, is disposed between the second thrust member 23 and the second side plate 18 and is an annular disc-like spring that biases the second thrust member 23 toward the flange section 25b. The disc spring 24 is stopped from its rotation by the second thrust member 23.

The hub member 25 is a member that outputs rotational power from the damper unit 3 and the hysteresis unit 4 toward the input shaft 6 of the transmission, and is a component of the damper unit 3 and the hysteresis unit 4. The hub member 25 has the flange section 25b extending from a predetermined region on the outer circumference of the hub section 25a. On an inner circumferential side, the hub section 25a spline engages with the input shaft 6. On the outer circumferential side, the hub section 25a supports the first side plate 17 through the first thrust member 22 so as to be relatively rotatable and supports the second side plate 18 through the second thrust member 23 so as to be relatively rotatable. In the damper unit 3 on the outer circumference side, the flange section 25b has the window section 25c that receives the coil spring 20 and the sheet member 21, and a circumferential-end surface of the window section 25c is detachably in contact with the sheet member 21. In the axial surface of the hysteresis unit 4 on the inner circumference side than the damper unit 3, the flange section 25b is slidably sandwiched between the thrust members 22, 23.

In Example 1, by providing the support parts 13a in the pressure plate 13 and receiving the pressing force of the disc spring 12 with the support parts 13a, the lining plate 14 (friction members 15, 16) can be sandwiched between the cover plate 11 and the pressure plate 13 without using the support plate as used in the conventional art. Therefore, the number of components can be reduced, thereby cutting costs of the apparatus.

Example 2

A torque fluctuation absorbing apparatus according to Example 2 will be described with reference to the accompanying drawings. FIG. 2 is a radial sectional view schematically showing a structure of the torque fluctuation absorbing apparatus according to Example 2 of the present invention.

In Example 2 as Variation of Example 1, support parts 31a are provided in a cover plate 31, rather than providing the support parts (13a in FIG. 1) in a pressure plate 32, and recesses 32a are provided on the pressure plate 32, rather than providing the holes (11a in FIG. 1) on the cover plate 31. Other configuration is the same as that of Example 1.

The cover plate 31 is an annular member and is a component of the limiter unit 2. On an outer circumferential side, the cover plate 31 is fixedly attached to the flywheel 5 with the bolt(s) 8 and rotates integrally with the flywheel 5. The cover plate 31 has a plurality of support parts 31a that engage with the pressure plate 32 so as to be relatively unrotatable and axially displaceable. Each support part 31a is a region bent by cutting an outer circumference of a main body of the cover plate 31, and has a first bending section 31c bent toward the flywheel 5 on its proximal (base) end side and a second bending section 31b bent toward an inner circumference side on its distal end side. A region of the support part 31a between the first bending section 31c and the second bending section 31b is inserted into the corresponding recess 32a of the pressure plate 32. By inserting the support parts 31a into the recesses 32a, the pressure plate 32 and the cover plate 31 engage with each other with a predetermined backlash (gap) so as to be relatively unrotatable and axially displaceable. A region of the support part 31a on a distal end side from the second bending section 31b is disposed at a distance from the pressure plate 32, and supports one end of the disc spring 12. On an inner circumferential side, the cover plate 31 is slidably in press contact with the friction member 16.

The pressure plate 32 is an annular member for pressing the lining plate 14 toward the cover plate 31, and is a component of the limiter unit 2. The pressure plate 32 has a plurality of recesses 32a on its outer circumference. The corresponding support parts 31a of the cover plate 31 are inserted into the recesses 32a. By inserting the support parts 31a into the recesses 32a, the cover plate 31 and the pressure plate 32 engage with each other with a predetermined backlash so as to be relatively unrotatable and axially displaceable, thereby preventing the pressure plate 32 from coming out of the cover plate 31. Although FIG. 2 shows an example in which the recesses 32a are formed in the pressure plate 32, holes passing through the pressure plate 32 can be formed in place of the recesses 32a. On the inner circumferential side, the surface of the pressure plate 32, which faces the flywheel 5, is biased toward the main body of the cover plate 31 with the disc spring 12, and is slidably in press contact with the friction member 15.

In Example 2, by providing the support parts 31a on the cover plate 31 and supporting one end of the disc spring 12 with the support parts 31a, the lining plate 14 (friction members 15, 16) can be sandwiched between the cover plate 31 and the pressure plate 32 without using the support plate according to the conventional art and therefore, the number of components can be reduced to cut costs of the apparatus.

Example 3

Figure 3B:
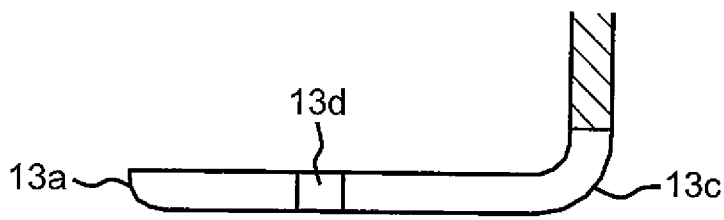
FIG. 3B is a partial plan view before assembling when viewed in the circumferential direction, which schematically show a structure of a support part of a pressure plate in a torque fluctuation absorbing apparatus according to Example 3 of the present invention.
Figure 3C:
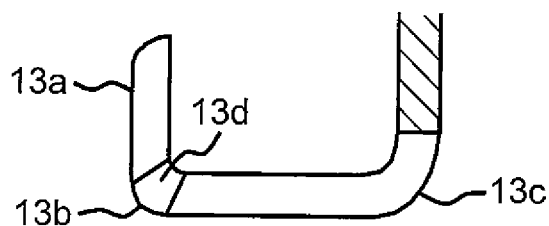
FIG. 3C is a partial plan view after assembling when viewed in the circumferential direction, which schematically show a structure of a support part of a pressure plate in a torque fluctuation absorbing apparatus according to Example 3 of the present invention.

A torque fluctuation absorbing apparatus according to Example 3 will be described with reference to the accompanying drawings. FIG. 3A is a partial plan view before assembling when viewed in a radial direction, which schematically show a structure of a support part of a pressure plate in a torque fluctuation absorbing apparatus according to Example 3 of the present invention; FIG. 3B is a partial sectional view before assembling when viewed in a circumferential direction, which schematically show a structure of a support part of a pressure plate in a torque fluctuation absorbing apparatus according to Example 3 of the present invention; and FIG. 3C is a partial plan view after assembling when viewed in the circumferential direction, which schematically show a structure of a support part of a pressure plate in a torque fluctuation absorbing apparatus according to Example 3 of the present invention.

Example 3 is a Variation of Example 1, and in this working example, in order to be able to easily bend the second bending sections 13b of the support parts 13a in the pressure plate 13 in assembling, recesses 13d are formed by cutting out a portion of ends of the second bending section 13b on both circumferential sides. Before assembling the pressure plate 13 to the cover plate (11 in FIG. 1), only the first bending section 13c on the proximal (base) end side of the support part 13a is bent as shown in FIGS. 3A and 3B) and in this state, the support parts 13a are inserted into the corresponding holes (11a in FIG. 1) of the cover plate (11 in FIG. 1) and the disc spring (12 in FIG. 1) is set, and then, the distal end of the support part 13a is bent toward an inner circumference side as shown in FIG. 3C. The bending is guided by the recesses 13d to form the second bending section 13b at a substantially constant position, and the pressure plate 13 is assembled to the cover plate (11 in FIG. 1). Other configuration is similar to that in Example 1. It is noted that recesses such as the recesses 13d of the second bending section 13b can be applied to the second bending sections (31b in FIG. 2) of the support parts (31a in FIG. 2) in the cover plate (31 in FIG. 2) in Example 2.

In Example 3, similar effects to those in Example 1 can be achieved and in addition, by forming the recesses 13d in the regions that become the second bending sections 13b of the support parts 13a in the pressure plate 13, the support parts 13 can be bent at the second bending sections 13b as intended upon assembling.

Example 4

Figure 4A:
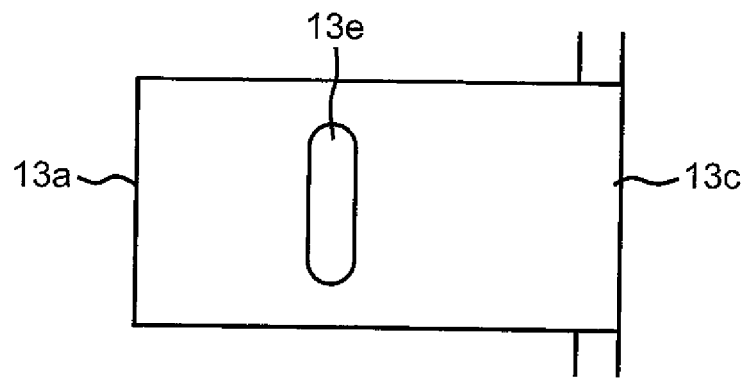
FIG. 4A is a partial plan view, when viewed in the radial direction before assembling, schematically showing a structure of a support part of a pressure plate in a torque fluctuation absorbing apparatus according to Example 4 of the present invention.
Figure 4B:
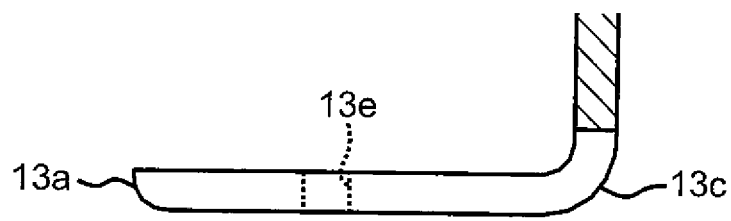
FIG. 4B is a partial plan view, when viewed in the circumferential direction before assembling, schematically showing a structure of a support part of a pressure plate in a torque fluctuation absorbing apparatus according to Example 4 of the present invention.
Figure 4C:
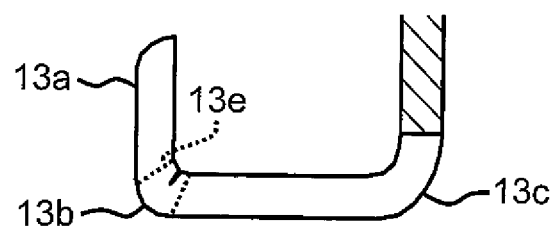
FIG. 4C is a partial plan view, when viewed in the circumferential direction after assembling, schematically showing a structure of a support part of a pressure plate in a torque fluctuation absorbing apparatus according to Example 4 of the present invention.

A torque fluctuation absorbing apparatus according to Example 4 will be described with reference to the accompanying drawings. FIG. 4A is a partial sectional view, when viewed in the radial direction before assembling, schematically showing a structure of a support part of a pressure plate in a torque fluctuation absorbing apparatus according to Example 4 of the present invention; FIG. 4B is a partial sectional view, when viewed in the circumferential direction before assembling, schematically showing a structure of a support part of a pressure plate in a torque fluctuation absorbing apparatus according to Example 4 of the present invention; and FIG. 4C is a partial sectional view, when viewed in the circumferential direction after assembling, schematically showing a structure of a support part of a pressure plate in a torque fluctuation absorbing apparatus according to Example 4 of the present invention.

Example 4 is a Variation of Example 3 and in this working example, in order to able to easily bend the second bending sections 13b of the support parts 13a in the pressure plate 13 upon assembling, a hole 13e that passes through an intermediate portion of the region that becomes the second bending section 13b is formed in place of the recesses (13d in FIG. 3). Before assembling the pressure plate 13 to the cover plate (11 in FIG. 1), only the first bending section 13c on the proximal end side of the support parts 13a is bent as shown in FIGS. 4A and 4B and in this state, the support part 13a is inserted into the corresponding hole (11a in FIG. 1) of the cover plate (11 in FIG. 1) and the disc spring (12 in FIG. 1) is set, and then, the distal end of the support part 13a is bent toward an inner circumference side (radially inward) as shown in FIG. 4C. The bending is guided by the hole 13e to form the second bending section 13b at a substantially constant position, and the pressure plate 13 is assembled to the cover plate (11 in FIG. 1). Other configuration is similar to that in Example 1. It is noted that a hole such as the hole 13e of the second bending section 13b can be applied to the second bending sections (31b in FIG. 2) of the support parts (31a in FIG. 2) in the cover plate (31 in FIG. 2) in Example 2.

In Example 4, similar effects to those in Example 1 can be achieved and in addition, by forming the holes 13e in the region that become the second bending sections 13b of the support parts 13a in the pressure plate 13, the support parts 13 can be bent at the second bending section 13b as intended in assembling.

Example 5

Figure 5A:
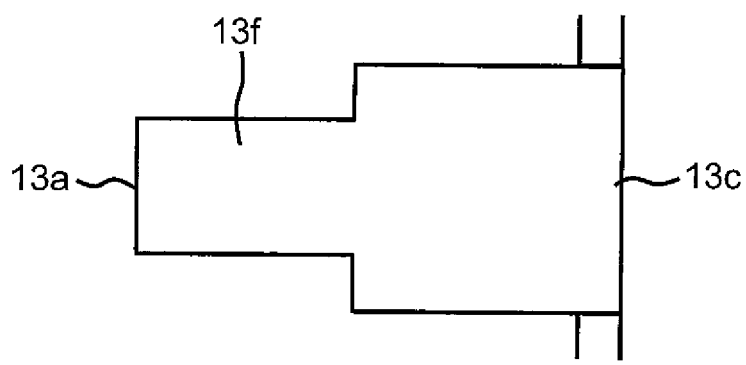
FIG. 5A is a partial plan view, when viewed in the radial direction before assembling, schematically showing a structure of a support part of a pressure plate in a torque fluctuation absorbing apparatus according to Example 5 of the present invention.
Figure 5B:
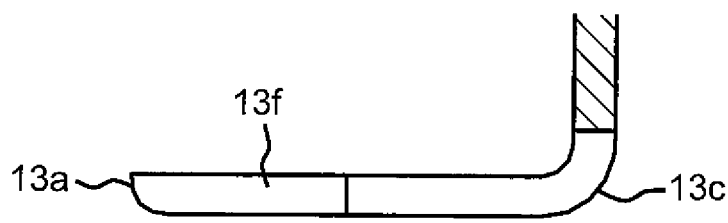
FIG. 5B is a partial plan view, when viewed in the circumferential direction before assembling, schematically showing a structure of a support part of a pressure plate in a torque fluctuation absorbing apparatus according to Example 5 of the present invention.
Figure 5C:
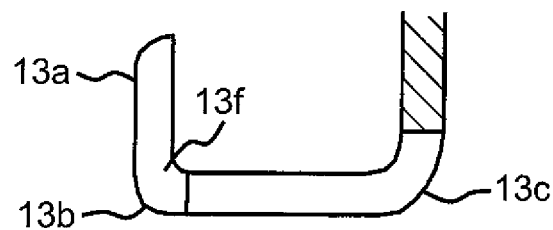
FIG. 5C is a partial plan view, when viewed in the circumferential direction after assembling, schematically showing a structure of a support part of a pressure plate in a torque fluctuation absorbing apparatus according to Example 5 of the present invention.

A torque fluctuation absorbing apparatus according to Example 5 will be described with reference to the accompanying drawings. FIG. 5A is a partial plan view, when viewed in the radial direction before assembling, schematically showing a structure of a support part of a pressure plate in a torque fluctuation absorbing apparatus according to Example 5 of the present invention; FIG. 5B is a partial sectional view, when viewed in the circumferential direction before assembling, schematically showing a structure of a support part of a pressure plate in a torque fluctuation absorbing apparatus according to Example 5 of the present invention; and FIG. 5C is a partial sectional view, when viewed in the circumferential direction after assembling, schematically showing a structure of a support part of a pressure plate in a torque fluctuation absorbing apparatus according to Example 5 of the present invention.

Example 5 is a Variation of Example 3 and in this working example, in order to be able to easily bend the second bending sections 13b of the support parts 13a in the pressure plate 13 in assembling, a small-width section 13f having a small circumferential width from the region that becomes the second bending section 13b to the distal end is formed in place of the recesses (13d in FIG. 3). Before assembling the pressure plate 13 to the cover plate (11 in FIG. 1), only the first bending section 13c on the proximal (base) end side of the support parts 13a is bent as shown in FIGS. 5A and 5B, and in this state, the support part 13a is inserted into the corresponding hole (11a in FIG. 1) of the cover plate (11 in FIG. 1) and the disc spring (12 in FIG. 1) is set, and then, the distal end of the support part 13a is bent toward an inner circumference side as shown in FIG. 5C. The bending is guided by a proximal end of the small-width section 13f, strength of which sharply changes, to form the second bending section 13b at a substantially constant position, and the pressure plate 13 is assembled to the cover plate (11 in FIG. 1). Other configuration is similar to that in Example 1. It is noted that a small-width section such as the small-width section 13f of the second bending section 13b can be applied to the second bending sections (31b in FIG. 2) of the support parts (31a in FIG. 2) in the cover plate (31 in FIG. 2) in Example 2.

In Example 5, similar effects to those in Example 1 can be achieved and in addition, by forming the small-width sections 13f in a region more distal than that becomes the second bending section 13b, the support parts 13 can be bent at the second bending section 13b as intended in assembling.

Example 6

A torque fluctuation absorbing apparatus according to Example 6 will be described with reference to the accompanying drawing. FIG. 6 is a radial sectional view illustrating assembling of a pressure plate in a torque fluctuation absorbing apparatus according to Example 6 of the present invention.

Example 6 is a Variation of Examples 3 to 5 and in this working example, rather than bending the second bending section 13b of the support part 13a in the pressure plate 13 in assembling, the second bending section 13b is previously bent and the first bending section 13c is bent in assembling. Before assembling the pressure plate 13 to the cover plate (11 in FIG. 1), the second bending section 13b of the support part 13a on the distal end side is (fully) bent and the first bending section 13c on the proximal end side is halfway bent, and in this state, the support part 13a is inserted into a corresponding opening 11b (or a hole or a notch that is larger than the hole 11a in FIG. 1) of the cover plate 11, and the disc spring (12 in FIG. 1) is set and then, the distal end of the support parts 13a is pressed toward an inner circumference side (i.e., radially inward). Thereupon, bending is guided by the bending of the halfway-bent first bending section 13c to form the first bending section 13c at a substantially constant position, and the pressure plate 13 is assembled to the cover plate (11 in FIG. 1). Other configuration is similar to that in Example 1. A method of bending the halfway-bent first bending section 13c in assembling can be applied to the first bending section (31c in FIG. 2) of the support parts (31a in FIG. 2) in the cover plate (31 in FIG. 2) of Example 2.

The opening 11b of the cover plate 11 has a dimension that enables the halfway-bent first bending section 13c of the support parts 13a to pass through the opening 11b, and is larger than the hole 11a in FIG. 1. A recess (or cut-out) cut from the outer circumferential surface of the cover plate 11 can be used in place of the opening 11b as long as it does not interfere with the bolt(s) (corresponding to 8 in FIG. 1).

Recesses like the recesses (13d in FIG. 3) of the second bending section (13b in FIG. 3) in Example 3 or a hole like the hole (13e in FIG. 4) of the second bending section (13b in FIG. 4) in Example 4 may be formed in the halfway-bent first bending section 13c. In order to be able to easily bend the support part 13a at the first bending section 13c, like the small-width section (13f in FIG. 5) in Example 5, a circumferential width of a region ranging from the second bending section 13b to the first bending section 13c of the support parts 13a may be reduced.

In Example 6, similar effects to those in Example 1 can be achieved and in addition, by bending the halfway-bent first bending section 13c in assembling, the support part can be bent at the first bending section 13c, as designed.

Example 7

A torque fluctuation absorbing apparatus according to Example 7 will be described with reference to the accompanying drawing(s). FIG. 7 is a radial partial sectional view schematically showing a limiter unit in the torque fluctuation absorbing apparatus according to Example 7 of the present invention.

Example 7 is a Variation of Example 2 and in this Example, a plate spring member 43 having functions of both the support parts (31a in FIG. 2) and the disc spring (12 in FIG. 2) is fixed to a cover plate 41 with a rivet(s) 44, in place of the support parts (31a in FIG. 2) and the disc spring (12 in FIG. 2). Other configuration is similar to that in Example 2.

The cover plate 41 is an annular member and is a component of the limiter unit 2. On an outer circumferential side, the cover plate 41 is fixedly attached to the flywheel (corresponding to 5 in FIG. 2) with the bolt(s) (corresponding to 8 in FIG. 2) and rotates integrally with the flywheel (corresponding to 5 in FIG. 2). The plate spring member 43 is fixedly attached to a surface of the cover plate 41, which surface is directed to a pressure plate 42, with the rivet(s) 44. On an inner circumferential side, the cover plate 41 is slidably in press contact with the friction member 16.

The pressure plate 42 is an annular member for pressing the lining plate 14 toward the cover plate 41, and is a component of the limiter unit 2. The pressure plate 42 has a plurality of recesses (cut-out) 42a in its outer circumference. The plate spring member(s) 43 fixed to the cover plate 41 is inserted into the recess(es) 42a. By inserting the plate spring member 43 into the recess 42a, the cover plate 41 and the pressure plate 42 engage with each other with a predetermined backlash so as to be relatively unrotatable and axially displaceable, thereby preventing the pressure plate 42 from coming out of the cover plate 41. On the inner circumference side of the pressure plate 42, a left surface in the figure is biased toward the cover plate 41 by the plate spring member 43 and a right surface in the figure is slidably in press contact with the friction member 15.

The plate spring member 43 is a spring obtained by forming a plate material into a predetermined shape, and is a component of the limiter unit 2. On an outer circumferential side, the plate spring member 43 is fixedly attached to the cover plate 41 with the rivet(s) 44. On an inner circumferential side, the plate spring member 43 is disposed at a distance (i.e., spaced) from the cover plate 41 and biases the pressure plate 42 toward the cover plate 41. An intermediate portion of the plate spring member 43 is inserted into (passes through) the corresponding recess 42a of the pressure plate 42. By inserting the plate spring member 43 into the recess 42a, the cover plate 41 and the pressure plate 42 engage with each other by means of the plate spring member 43 so as to be relatively unrotatable and axially displaceable, thereby preventing the pressure plate 42 from coming out. A press-molded rectangular plate material can be used as the plate spring member(s) 43.

In Example 7, since the plate spring member(s) 43 fixed to the cover plate 41 with the rivet(s) 44 biases the pressure plate 42 toward the cover plate 41, no discarded material is generated in processing of the plate spring member(s) 43, thereby enhancing yield and reducing costs of the apparatus.

Example 8

A torque fluctuation absorbing apparatus according to Example 8 will be described with reference to the accompanying drawings. FIG. 8 is a radial sectional view schematically showing a structure of a limiter unit of the torque fluctuation absorbing apparatus according to Example 8 of the present invention.

Example 8 is a Variation of Example 7 and in this working example, a cover plate 51 is provided with a spring section 51a corresponding to the plate spring member (43 in FIG. 7). Other configuration is similar to that in Example 7.

The cover plate 51 is an annular member and is a component of the limiter unit 2. On an outer circumferential side, the cover plate 41 is fixedly attached to the flywheel (corresponding to 5 in FIG. 2) with the bolt(s) (corresponding to 8 in FIG. 2), and rotates integrally with the flywheel (corresponding to 5 in FIG. 2). The cover plate 51 engages with a pressure plate 52 so as to be relatively unrotatable and axially displaceable and has a plurality of spring sections 51a for biasing the pressure plate 52 toward a main body of the cover plate 51. Each spring section 51a is a region bent by cutting out an outer circumference of the main body of the cover plate 51 and has a first bending section 51c bent toward the pressure plate 52 on its proximal end side and a second bending section 51b bent toward an inner circumference side on its distal end side. A region of the spring section 51a between the first bending section 51c and the second bending section 51b is inserted into a corresponding recess 52a of the pressure plate 52. By inserting the spring sections 51a into the recesses 52a, the pressure plate 52 and the cover plate 51 engage with each other with a predetermined backlash (gap) so as to be relatively unrotatable and axially displaceable. A region of the spring section 51a ranging from the second bending section 51b to the distal end is disposed at a distance (i.e., spaced) from the pressure plate 52, and a region ranging from the second bending section 51b to the distal end biases the pressure plate 52 toward the main body of the cover plate 51. The cover plate 51 is assembled by previously bending the second bending section 51b of the spring section 51a in the cover plate 51 and further bending the halfway-bent first bending section 51c in assembling. By thermally hardening (i.e., heat-treating followed by quenching) the bent second bending section 51b of the spring section 51a in a pre-assembling stage of the cover plate 51, spring properties of the spring section 51a can be set. On an inner circumferential side, the cover plate 51 is slidably in press contact with the friction member 16.

The pressure plate 52 is an annular member for pressing the lining plate 14 toward the main body of the cover plate 51 and is a component of the limiter unit 2. The pressure plate 52 has the plurality of recesses 52a in its outer circumference. The spring sections 51a of the cover plate 51 are inserted into the recesses 52a. By inserting the spring sections 51a into the recesses 52a, the cover plate 51 and the pressure plate 52 engage with each other with a predetermined backlash so as to be relatively unrotatable and axially displaceable, thereby preventing the pressure plate 52 from coming out of the cover plate 51. In the inner circumference of the pressure plate 52, a left surface in the figure is biased toward the main body of the cover plate 51 by the spring sections 51a and a right surface in the figure is slidably in press contact with the friction member 15.

In Example 8, since the spring sections 51a of the cover plate 51 bias the pressure plate 52 toward the cover plate 51, the lining plate 14 (friction members 15, 16) can be sandwiched between the cover plate 51 and the pressure plate 52 without using the support plate and the disc spring as used in the conventional art, enabling reduction of the number of components and costs of the apparatus. Moreover, the number of components can be further reduced as compared to the apparatus in Example 7.

Example 9

A torque fluctuation absorbing apparatus according to Example 9 will be described with reference to the accompanying drawings. FIG. 9 is a radial sectional view schematically showing a structure of a limiter unit of the torque fluctuation absorbing apparatus according to Example 9 of the present invention.

Example 9 is a Variation of Example 1 and in this working example, a plate spring member 63 having functions of both the support parts (13a in FIG. 1) and the disc spring (12 in FIG. 1), in place of the support parts (13a in FIG. 1) and the disc spring (12 in FIG. 1), is fixed to a pressure plate 62 with a rivet(s) 64. Other configuration is similar to that in Example 1.

A cover plate 61 is an annular member and is a component of the limiter unit 2. On an outer circumferential side, the cover plate 61 is fixedly attached to the flywheel (corresponding to 5 in FIG. 1) with a bolt(s) (corresponding to 8 in FIG. 1) and rotates integrally with the flywheel (corresponding to 5 in FIG. 1). The cover plate 61 has a plurality of recesses 61*a* formed by cutting out the outer circumferential surface of the cover plate 61 toward an inner circumference side. The plate spring member 63 fixed to the pressure plate 62 is inserted into the recess 61*a*. By inserting the plate spring member 63 into the recess 61*a*, the cover plate 61 and the pressure plate 62 engage with each other with a predetermined backlash so as to be relatively unrotatable and axially displaceable. On the inner circumferential side, the cover plate 61 is slidably in press contact with the friction member 15.

The pressure plate 62 is an annular member for pressing the lining plate 14 toward the cover plate 61 and is a component of the limiter unit 2. The plate spring member 63 is fixedly attached to an outer circumference of the pressure plate 62, which opposes the cover plate 61, with the rivet(s) 64, and is biased toward the cover plate 61 by the plate spring member 63 supported by the cover plate 61. On an inner circumferential side, the pressure plate 62 is slidably in press contact with the friction member 16.

The plate spring member 63 is a spring obtained by forming a plate material into a predetermined shape, and is a component of the limiter unit 2. On an outer circumferential side, the plate spring member 63 is fixedly attached to the pressure plate 62 with the rivet(s) 64. On an inner circumferential side, the plate spring member 63 is disposed at a distance from the pressure plate 62 and supported by the cover plate 61. The plate spring member 63 biases the pressure plate 62 toward the cover plate 61. An intermediate region of the plate spring member 63 is inserted into (passes through) the corresponding recess 61*a* of the cover plate 61. By inserting the plate spring member(s) 63 into the recess(es) 61*a*, the cover plate 61 and the pressure plate 62 engage with each other through the plate spring member 63 so as to be relatively unrotatable and axially displaceable, thereby preventing the pressure plate 62 from coming out. A press-formed rectangular plate material can be used as the plate spring member 63.

In Example 9, since the plate spring member 63 fixed to the pressure plate 62 with the rivet(s) 64 biases the pressure plate 62 toward the cover plate 61, no discarded material is generated in processing of the plate spring member 63, enhancing yield and reducing costs of the apparatus.

Example 10

A torque fluctuation absorbing apparatus according to Example 10 will be described with reference to the accompanying drawings. FIG. 10 is a radial sectional view schematically showing a structure of a limiter unit of the torque fluctuation absorbing apparatus according to Example 10 of the present invention.

Example 10 is a Variation of Example 9, and in this working example, a pressure plate 72 is provided with spring sections 72*a* corresponding to the plate spring member (63 in FIG. 9).

Other configuration is similar to that in Example 9.

A cover plate 71 is an annular member and is a component of the limiter unit 2. On an outer circumferential side, the cover plate 71 is fixedly attached to flywheel (corresponding to 5 in FIG. 1) with a bolt(s) (corresponding to 8 in FIG. 1) and rotates integrally with the flywheel (corresponding to 5 in FIG. 1). The cover plate 71 has a plurality of recesses 71*a* formed by cutting out the outer circumferential surface of the cover plate 71 toward an inner circumference side (i.e., radially inward). The spring sections 72*a* of the pressure plate 72 are inserted into the recesses 71*a*. By inserting the spring sections 72*a* into the recesses 71*a*, the cover plate 71 and the pressure plate 72 engage with each other with a predetermined backlash so as to be relatively unrotatable and axially displaceable. On an inner circumferential side, the cover plate 71 is slidably in press contact with the friction member 15.

The pressure plate 72 is an annular member for pressing the lining plate 14 toward the cover plate 71 and is a component of the limiter unit 2. The pressure plate 72 engages with the cover plate 71 so as to be relatively unrotatable and axially displaceable, is supported by the cover plate 71 and has a plurality of spring sections 72*a* for biasing the pressure plate 72 toward the cover plate 71. Each spring section 72*a* is a region extending from a predetermined position of the outer circumferential surface of the pressure plate 13, and has a first bending section 72*c* bent toward the cover plate 71 on its proximal end side and a second bending section 72*b* bent toward an inner circumference side on its distal end side. A region of the spring section 72*a* ranging from the first bending section 72*c* to the second bending section 72*b* is inserted into the recess 71*a* of the cover plate 71. By inserting the spring sections 72*a* into the recesses 71*a*, the pressure plate 72 and the cover plate 71 engage with each other with a predetermined backlash (gap) so as to be relatively unrotatable and axially displaceable. A region of the spring section 72*a* ranging more distal (remote) from the second bending section 72*b* is disposed at a distance from a main body of the pressure plate 72, and a region ranging more distal from the second bending section 72*b* is supported by the cover plate 71, thereby putting the main body of the pressure plate 72 into press contact with the friction member 16 to prevent the pressure plate 72 from coming out of the cover plate 71.

In Example 10, since the spring sections 72*a* of the pressure plate 72 bias the main body of the pressure plate 72 toward the cover plate 71, the lining plate 14 (friction members 15, 16) can be sandwiched between the cover plate 71 and the pressure plate 72 without using the support plate and the disc spring as used in the conventional art, enabling reduction of the number of components and costs of the apparatus. Moreover, the number of components can be further reduced as compared to Example 9.

Example 11

A torque fluctuation absorbing apparatus according to Example 11 will be described with reference to the accompanying drawing. FIG. 11A is a plan view showing a structure of a plate spring member of a limiter unit in a torque fluctuation absorbing apparatus according to Example 11 of the present invention; and FIG. 11B is a sectional view taken along a line X-X' showing a structure of a plate spring member of a limiter unit in a torque fluctuation absorbing apparatus according to Example 11 of the present invention.

Example 11 is a Variation of Example 7 and in this working example, rather than pressing one spot of the pressure plate (42 in FIG. 7) onto one plate spring member (43 in FIG. 7), a plurality of spots of the pressure plate 42 (three spots in FIG. 11) are pressed onto one plate spring member 81. In Example 11, one plate spring member 81 is coupled to the cover plate 41 with a plurality of rivets 44. Configuration other than the plate spring member 81 is similar to that in Example 7.

The plate spring member 81 is a member having a plate spring function, which is obtained by forming (press-forming) a plate material into a predetermined shape and is a component of the limiter unit. The plate spring member 81 has an arc-like (arcuate) base section 81*a*. The base section 81*a* is a region that serves as a base (or seat) when being coupled to the cover plate 41 with the rivets 44. The base section 81*a* has a plurality of (three in FIG. 11) extending sections 81*b* extending from a predetermined region of an inner circumferential end in the axial direction and/or toward an inner circumference side. Each of the extending section 81*b* is a region having a plate spring function, its inner circumference is disposed at a distance from the cover plate 41 and has a pressing section 81*c* that biases the pressure plate 42 toward the cover plate 41. The pressing section 81*c* protrudes toward the pressure plate 42 in the circumferential direction. The extending sections 81*b* are inserted into the respective recesses 42*a* of the pressure plate 42. By inserting the extending sections 81*b* into the recesses 42*a*, the cover plate 41 and the pressure plate 42 engage with each other through the plate spring member 81 so as to be relatively unrotatable and axially displaceable, thereby preventing the pressure plate 42 from coming out. The base section 81*a* has a plurality of rivet holes 81*d* formed in the vicinity of an outer circumference of the extending section 81*b*. The rivets 44 are inserted into the rivet holes 81 and the rivets 44 are crimped to fixedly attach the plate spring member 81 to the cover plate 41. The plate spring member 81 is disposed next to another plate spring member 81 in the circumferential direction.

In Example 11, by fixedly attaching the plate spring member 81 to the cover plate 41 with the plurality of rivets 44, the plate spring member 81 can be prevented from rotating with respect to the cover plate 41. Since one plate spring member 81 has a plurality of pressing sections 81*c*, assembling is easier as compared to Example 7. Further, since the base section 81*a* of the plate spring member 81 is fixedly attached to the cover plate 41 in the vicinity of the outer circumference side of the extending sections 81*b* with the rivets 44, the base section 81*a* can be prevented from being floated from the cover plate 41 due to a reaction force of the spring force of the extending sections 81*b*. Moreover, since the plate spring member 81 is not annular and is divided in the form of an arc, the amount of discarded material can be reduced in processing of the plate spring member 81, enhancing yield and reducing costs of the apparatus.

Example 12

A torque fluctuation absorbing apparatus according to Example 12 of the present invention will be described with reference to the accompanying drawings. FIG. 12A is a plan view showing a structure of a plate spring member of a limiter unit in a torque fluctuation absorbing apparatus according to Example 12 of the present invention; FIG. 12B is a sectional view taken along a line X-X' showing a structure of a plate spring member of a limiter unit in a torque fluctuation absorbing apparatus according to Example 12 of the present invention; and FIG. 12C is a sectional view taken along a line Y-Y' showing a structure of a plate spring member of a limiter unit in a torque fluctuation absorbing apparatus according to Example 12 of the present invention.

Example 12 is a Variation of Example 11 and in this working example, rather than protruding the pressing sections (81*c* in FIG. 11) toward the pressure plate (42 in FIG. 11) in the circumferential direction, pressing sections 91*c*, 91*d* are protruded from both circumferential sides of an inner circumference of each extending sections 91*b* toward the pressure plate 42 in the radial direction. Configuration other than a plate spring member 91 is similar to that in Example 11.

The plate spring member 91 is a member having a plate spring function, which is obtained by forming (press-forming) a plate material into a predetermined shape, and a component of the limiter unit. The plate spring member 91 has an arc-like (arcuate) base section 91*a*. The base section 91*a* is a part that serves as a base when being coupled to the cover plate 41 with the rivets 44. The base section 91*a* has a plurality of (three in FIG. 12) extending sections 91*b* extending from predetermined positions of an inner circumference end in the axial direction and/or toward an inner circumference side. The extending sections 91*b* are sections having the plate spring function, and its inner circumferences are disposed at a distance (spaced) from the cover plate 41. Each extending section 91*b* has pressing sections 91*c*, 91*d* that bias the pressure plate 42 toward the cover plate 41, on regions protruding from both circumferential sides of the inner circumference. The pressing sections 91*c*, 91*d* protrude toward the pressure plate 42 extending in the radial direction. The extending sections 91*b* are inserted into the corresponding recesses 42*a* of the pressure plate 42. By inserting the extending sections 91*b* into the recesses 42*a*, the cover plate 41 and the pressure plate 42 engage with each other by way of the plate spring member 91 so as to be relatively unrotatable and axially displaceable, thereby preventing the pressure plate 42 from coming (falling) out. The base section 91*a* has a plurality of rivet holes 91*d* formed in the vicinity of an outer circumference of the extending sections 91*b*. The rivets 44 are inserted through the rivet holes 91, and the rivets 44 are crimped to fixedly attach the plate spring member 91 to the cover plate 41. The plate spring member 91 is disposed next to another plate spring member 91 in the circumferential direction.

Example 12 can achieve the same effects as those in Example 11.

Figure 13:
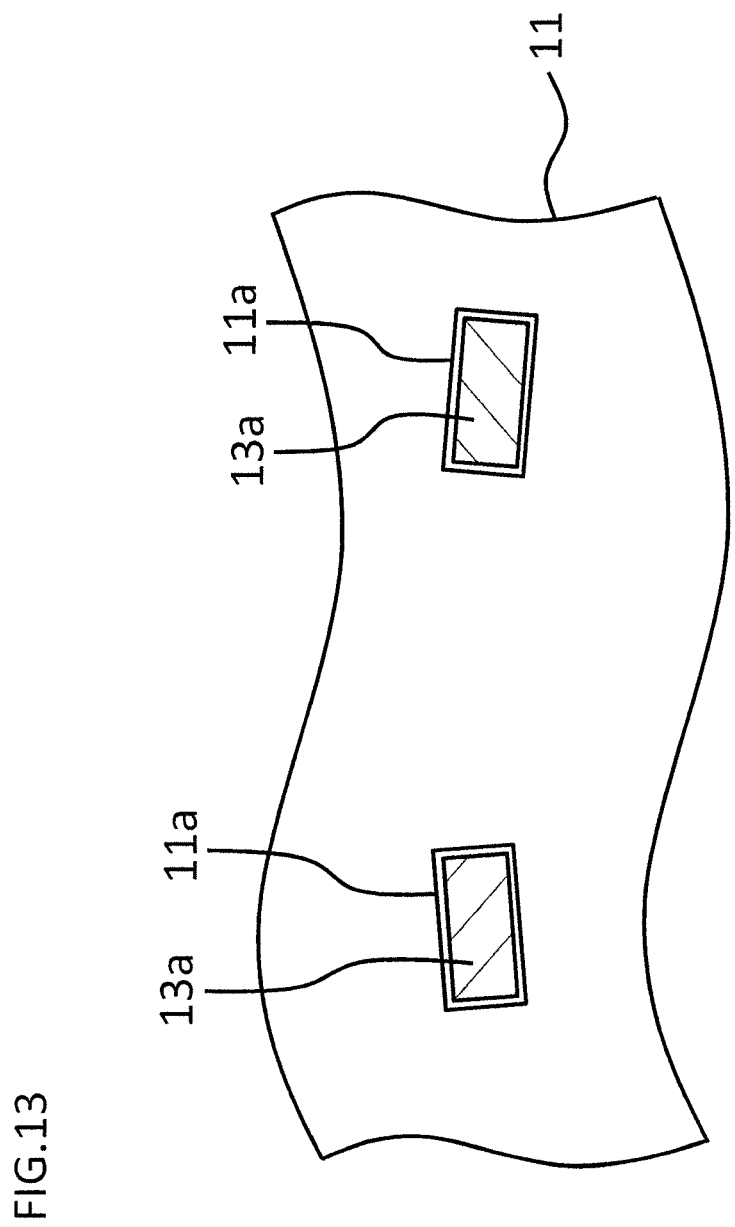
FIG. 13 illustrates a cross-sectional view of a portion of a cover plate.

FIG. 13 illustrates a cross-sectional view of a portion of a cover plate 11 showing holes 11*a* and support parts 13*a*.

Figure 14:
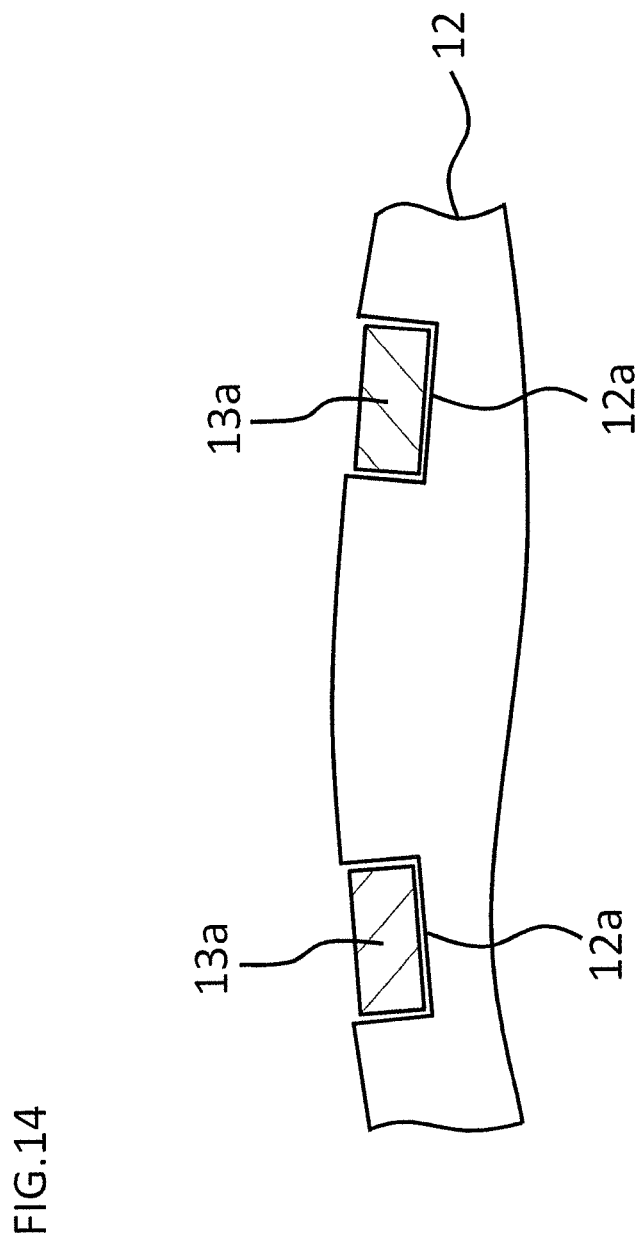
FIG. 14 illustrates a cross-sectional view of a portion of a disc spring.

FIG. 14 illustrates a cross-sectional view of a portion of a disc spring 12 showing recesses 12*a* and support parts 13*a*.

Embodiments and Examples can be modified and adjusted within the scope of the entire disclosure (including claims) of the present invention and based on its basic technical concept. Various disclosed elements can be variously combined and selected within the scope of claims of the present invention. That is, as a matter of course, the present invention has various variations and modifications that could be made by those skilled in the art according to the entire disclosure including claims and its technical concept.

EXPLANATION OF REFERENCE SYMBOLS

1 Torque fluctuation absorbing apparatus
2 Limiter unit
3 Damper unit
4 Hysteresis unit
5 Flywheel
6 Input shaft
7, 8 Bolt
11 Cover plate (First plate)
11*a* Hole
11*b* Opening
12 (Annular) disc spring (Resilient section)
12*a* Recess (cut-out)
13 Pressure plate (Second plate)
13*a* Support parts
13*b* Second bending section
13*c* First bending section
13*d* Recess (Guide recess)
13*e* Hole (Guide hole)
13*f* Small-width section
14 Lining plate (Third plate)
15, 16 Friction member
17 First side plate
17*a* Window section
18 Second side plate
18*a* Window section 19 Rivet
20 Coil spring
21 Sheet member
22 First thrust member
23 Second thrust member
24 (Annular) disc spring
25 Hub member
25a Hub section
25b Flange section
25c Window section
31 Cover plate (First plate)
31a Support part
31b Second bending section
31c First bending section
32 Pressure plate (Second plate)
32a Recess
41 Cover plate (First plate)
42 Pressure plate (Second plate)
42a Recess
43 Plate spring member (Resilient section)
44 Rivet
51 Cover plate (First plate)
51a Spring section (Resilient section)
51b Second bending section
51c First bending section
52 Pressure plate (Second plate)
52a Recess
61 Cover plate (First plate)
61a Recess
62 Pressure plate (Second plate)
63 Plate spring member (Resilient section)
64 Rivet
71 Cover plate (First plate)
71a Recess
72 Pressure plate
72a Spring section (Resilient section)
72b Second bending section
72c First bending section
81 Plate spring member (Resilient section)
81a Base section
81b Extending sections
81c Pressing section
81d Rivet hole
91 Plate spring member (Resilient section)
91a Base section
91b Extending section
91c, 91d Pressing section
91e Rivet hole

The invention claimed is:

1. A fluctuation absorbing apparatus, comprising:
a first plate fixed to a flywheel, the flywheel being rotatable around a rotation axis;
a second plate disposed at a distance from the first plate;
a third plate slidably sandwiched between the first plate and the second plate;
a resilient section that is supported by, fixed to or integrated with the first plate or the second plate and biases the second plate toward the first plate;
a damper unit that absorbs fluctuating torque;
a hysteresis unit that absorbs the fluctuating torque;
wherein one plate of the first and second plates has a plurality of holes or recesses;
wherein the resilient section is an annular disc spring supported by said one plate;
wherein the other plate of the first and second plates includes a plurality of support parts, each extending from the other plate, the plurality of support parts receiving a pressing force of the annular disc spring;
wherein the annular disc spring is sandwiched between the support parts and the one plate; and
wherein in a radial direction of the first plate, a distance from the rotation axis to a contact portion of the resilient section in the support parts is greater than a distance from the rotation axis to an end of the third plate.

2. The torque fluctuation absorbing apparatus according to claim 1, wherein each of the support parts has a first bending section bent toward said one plate on its proximal end side and a second bending section bent toward a radially inner circumference side on its distal side, and receives a pressing force of the annular disc spring in a region distal of the second bending section.

3. The torque fluctuation absorbing apparatus according to claim 1, wherein each of the support parts has a first bending section bent toward said one plate on its proximal end side and a second bending section bent toward a radially inner circumference side on its distal side, and receives a pressing force of the annular disc spring in a region distal of the second bending section; and
wherein a region between the first bending section and the second bending section of each of the support parts passes through corresponding hole or recess and engages with the hole or the recess with a predetermined backlash so as to be relatively unrotatable and axially displaceable.

4. The torque fluctuation absorbing apparatus according to claim 1, wherein the annular disc spring has a plurality of holes or recesses that unrotatably engage with corresponding support parts.

5. The torque fluctuation absorbing apparatus according to claim 1,
wherein the support parts each have a first bending section bent toward said one plate on its proximal end side and a second bending section bent toward a radially inner circumference side on its distal side, and receive a pressing force of the annular disc spring in a region more distal than the second bending section; and
wherein one or both of the first bending section and the second bending section of each of the support parts has a guide recess or a guide hole that guides the bending section.

6. The torque fluctuation absorbing apparatus according to claim 1,
wherein the support parts each have a first bending section bent toward said one plate on its proximal end side and a second bending section bent toward a radially inner circumference side on its distal side, and receive a pressing force of the annular disc spring in a region more distal than the second bending section; and
wherein the support parts each have a small-width section having a smaller circumferential width than other sections in a region more distal than the first bending section or in a region between the first bending section and the second bending section.

* * * * *

UNITED STATES PATENT AND TRADEMARK OFFICE
CERTIFICATE OF CORRECTION

PATENT NO. : 9,127,720 B2
APPLICATION NO. : 13/514386
DATED : September 8, 2015
INVENTOR(S) : Tomohiro Saeki et al.

Page 1 of 1

It is certified that error appears in the above-identified patent and that said Letters Patent is hereby corrected as shown below:

Title Page, item (73) Assignee change "MITSUBISHI ELECTRIC CORPORATION, Chiyoda-Ku, Tokyo, JAPAN" to --AISIN SEIKI KABUSHIKI KAISHA, Kariya-shi, Aichi, JAPAN--.

Signed and Sealed this
Ninth Day of August, 2016

Michelle K. Lee
*Director of the United States Patent and Trademark Office*